United States Patent
Kim et al.

(10) Patent No.: US 8,318,344 B2
(45) Date of Patent: Nov. 27, 2012

(54) NEGATIVE ELECTRODE FOR LITHIUM BATTERY AND LITHIUM BATTERY INCLUDING THE SAME

(75) Inventors: Beom-Kwon Kim, Yongin-si (KR); Kyu-Nam Joo, Yongin-si (KR); Jae-Myung Kim, Yongin-si (KR); So-Ra Lee, Yongin-si (KR); Jong-Hee Lee, Yongin-si (KR); Young-Su Kim, Yongin-si (KR); Deok-Hyun Kim, Yongin-si (KR); Gu-Hyun Chung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 234 days.

(21) Appl. No.: 12/820,043

(22) Filed: Jun. 21, 2010

(65) Prior Publication Data

US 2011/0052997 A1    Mar. 3, 2011

(30) Foreign Application Priority Data

Sep. 2, 2009    (KR) .................. 10-2009-0082567

(51) Int. Cl.
    *H01M 2/16* (2006.01)
(52) U.S. Cl. ............. 429/209; 429/232; 429/231.5; 429/218.1
(58) Field of Classification Search ............. 429/231.95, 429/209, 232, 231.4, 218.1
    See application file for complete search history.

(56) References Cited

U.S. PATENT DOCUMENTS

| | | | |
|---|---|---|---|
| 5,888,670 A * | 3/1999 | Kawakami | 429/231.4 |
| 5,928,810 A * | 7/1999 | Bernard et al. | 429/235 |
| 6,579,649 B2 * | 6/2003 | Tsutsue et al. | 429/309 |
| 7,122,279 B2 | 10/2006 | Tamura et al. | |
| 7,384,707 B2 * | 6/2008 | Nagayama et al. | 429/233 |
| 7,597,997 B2 * | 10/2009 | Sato et al. | 429/220 |
| 7,811,709 B2 * | 10/2010 | Musha et al. | 429/233 |
| 8,178,243 B2 * | 5/2012 | Saito et al. | 429/231.95 |
| 2012/0009465 A1 * | 1/2012 | Kato et al. | 429/166 |

FOREIGN PATENT DOCUMENTS

| | | |
|---|---|---|
| JP | 2004-139768 | 5/2004 |
| JP | 2004-178970 A | 6/2004 |
| JP | 2006-216158 | 8/2006 |
| JP | 2006-260886 | 9/2006 |
| KR | 10-0481660 | 1/2003 |

OTHER PUBLICATIONS

KIPO Office action dated Apr. 20, 2011, corresponding to Korean priority Patent application. 10-2009-0082-567.
Patent Abstracts of Japan and English machine translation of Japanese Publication. 2004-178970, 14 pages.
Korean Registration Determination Certificate dated Nov. 20, 2011 issued to corresponding application No. 10-2009-0082567, 5 pages.
Shin, H.C. and Lu, M, *Three-Dimensional Porous Copper-Tin Alloy Electrodes for Rechargeable Lithium Batteries*, Adv. Funct. Mater. 2005, vol. 15, No. 4, April, pp. 582-586, Atlanta, GA.

* cited by examiner

*Primary Examiner* — Joseph Del Sole
*Assistant Examiner* — Nahida Sultana
(74) *Attorney, Agent, or Firm* — Christie, Parker & Hale, LLP

(57) ABSTRACT

A negative electrode for a lithium battery includes an active material layer and a current collector. The active material layer has a plurality of crystal grains and the plurality of crystal grains include a plurality of pores. A first pore of the plurality of pores has a first length and a second length, the first length being the maximum length orthogonal to the current collector and the second length being the maximum length orthogonal to the first length, and the first length is greater than the second length.

18 Claims, 9 Drawing Sheets

US 8,318,344 B2

NEGATIVE ELECTRODE FOR LITHIUM BATTERY AND LITHIUM BATTERY INCLUDING THE SAME

CROSS-REFERENCE TO RELATED APPLICATIONS

This application claims priority to and the benefit of Korean Patent Application No. 10-2009-0082567, filed in the Korean Intellectual Property Office on Sep. 2, 2009, entire content of which is incorporated herein by reference.

BACKGROUND

1. Field

Aspects of embodiments of the present invention relate to a negative electrode and a lithium battery including the same.

2. Description of the Related Art

Lithium secondary batteries have recently received more attention as a power source for small and portable electronic devices. As lithium secondary batteries include an organic electrolyte, they can have a discharge voltage that is at least twice as high as that of a conventional battery including an alkali aqueous solution. Thus, lithium secondary batteries have a higher energy density than conventional batteries.

Examples of a positive electrode active material for lithium secondary batteries include $LiCoO_2$, $LiMn_2O_4$, and $LiNi_{1-x}Co_xO_2$ where $0<x<1$, each of which is an oxide that contains lithium and a transition metal and has a structure capable of intercalating lithium ions.

Examples of a negative electrode active material for lithium secondary batteries include various types of carbonaceous materials, such as artificial graphite, natural graphite, or hard carbon, having a structure capable of intercalating and deintercalating lithium ions. However, demands for stability and high capacity have led to research into non-carbonaceous materials, such as Si, for use as negative electrode active materials. Although some non-carbonaceous materials have a capacity that is 10 times greater than that of graphite, non-carbonaceous materials used in the negative electrode can reduce the cycle life of a lithium secondary battery due to swelling and shrinking of the electrode during charging and discharging.

SUMMARY

In embodiments of the present invention, a rechargeable lithium battery may have improved capacity and cycle life.

According to an embodiment of the present invention, a negative electrode for a lithium battery includes a current collector and an active material layer. A first surface of the active material layer contacts a first surface of the current collector. The active material layer includes a plurality of crystal grains. A first crystal grain includes a matrix comprising active material that is capable of intercalating and deintercalating lithium ions. The first crystal grain also includes a plurality of pores. The pores include a first pore which has a first length and a second length. The first length is the maximum length among lengths orthogonal to the first surface of the current collector and the second length is the maximum length among lengths orthogonal to the first length. The first length is greater than the second length.

According to an embodiment of the present invention, a lithium battery includes a negative electrode, a positive electrode, and an electrolyte.

BRIEF DESCRIPTION OF THE DRAWINGS

The above and other features and aspects of the present invention will become more apparent by reference to the following detailed description when considered in conjunction with the attached drawings in which.

DETAILED DESCRIPTION

Figure 1:
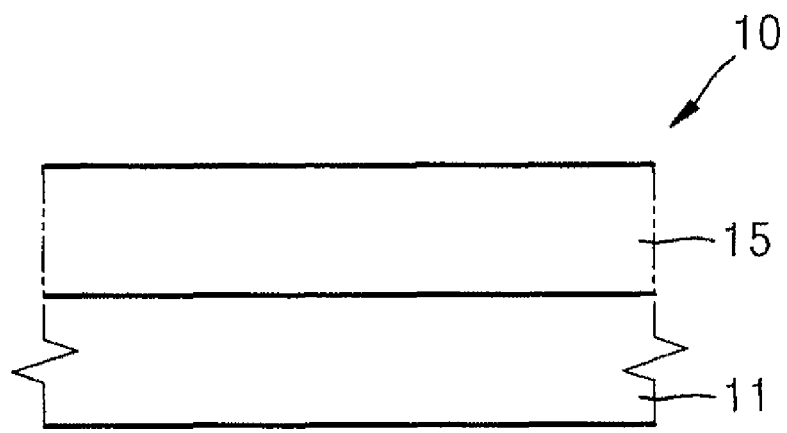
FIG. 1 is a schematic cross-sectional view of a negative electrode according to an embodiment of the present invention.

Exemplary embodiments will now be described more fully with reference to the accompanying drawings, however, they may be embodied in different forms and should not be construed as being limited to the embodiments set forth herein. Rather, these embodiments are provided so that the disclosure is thorough and complete, and will fully convey the scope of the invention to those skilled in the art. In the drawings and the specification, like reference numerals refer to like elements.

FIG. 1 is a schematic cross-sectional view of a negative electrode 10 according to an embodiment of the present invention. The negative electrode 10 includes a current collector 11 and an active material layer 15. A first surface of the active material layer 15 contacts a first surface of the collector 11. In the present specification, the term "first surface of the current collector" refers to a surface of the collector which contacts the active material layer 15.

Non-limiting examples of materials suitable for use as a current collector 11 include copper foil, nickel foil, stainless steel foil, titanium foil, nickel foam, copper foam, or a polymer substrate coated with conductive metal. In addition, the current collector 11 may also include a mixture of these materials or a stack of layers of these materials.

Figure 2A:
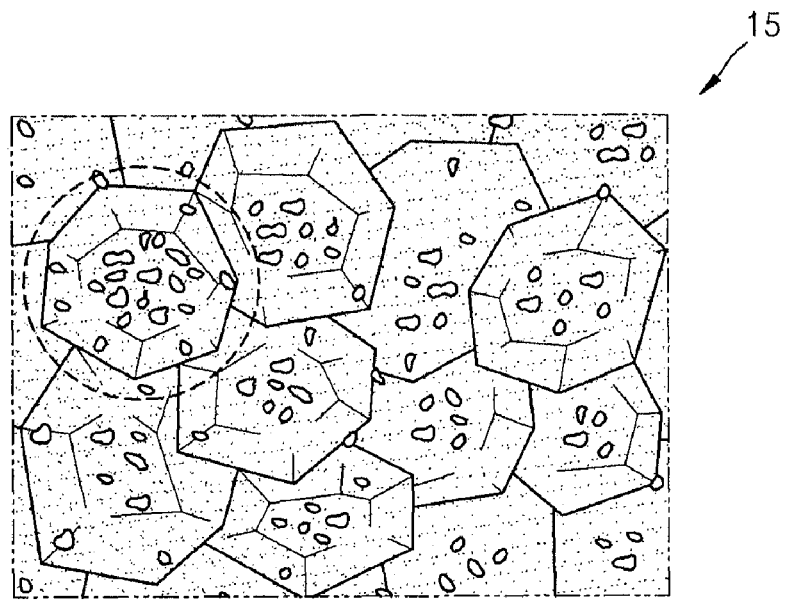
FIG. 2A is a schematic view of a portion of a surface of an active material layer of the negative electrode according to an embodiment of the present invention.

FIG. 2A is a schematic view of a portion of a surface of the active material layer 15. The active material layer 15 includes, as illustrated in FIG. 2A, a plurality of crystal grains that have irregular shapes and are irregularly arranged.

Figure 2B:
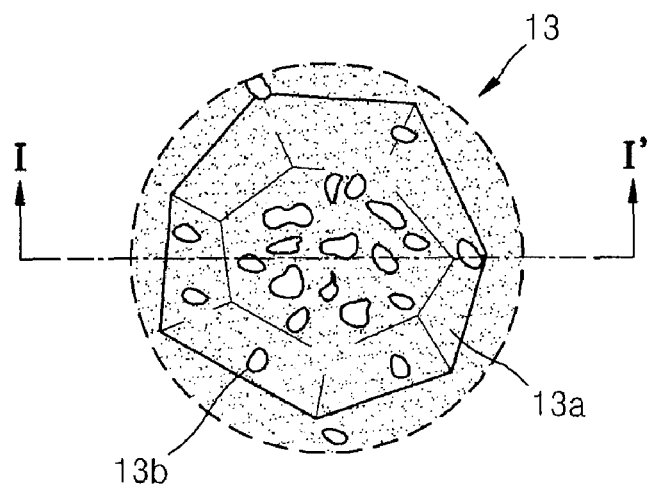
FIG. 2B is a schematic enlarged view of the surface of a first crystal grain inside the dashed circle of FIG. 2A.

FIG. 2B is a schematic enlarged view of the surface of a first crystal grain 13 inside the dashed circle of FIG. 2A. The first crystal grain 13 is one of the crystal grains present at the surface of the active material layer 15. The first crystal grain 13 includes a matrix 13a including an active material capable of intercalating and deintercalating lithium ions. The first crystal grain 13 also includes a plurality of pores 13b.

In other words, the term "first crystal grain" refers to, among a plurality of crystal grains contained in the active material layer 15, a crystal grain including a matrix 13a including an active material capable of intercalating and deintercalating lithium ions and including pores 13b. The active material layer 15 may include a plurality of first crystal grains 13. Additionally, the active material layer 15 may further include, in addition to the first crystal grain 13, a crystal grain which includes the matrix 13a only including an active material capable of intercalation and deintercalation of lithium ions, i.e., it does not include pores.

In the present specification, the term "matrix including an active material capable of intercalating and deintercalating lithium ions" or "the matrix" refers to a portion of the first crystal grain other than a plurality of pores.

For example, the matrix 13a may only include the active material capable of intercalating and deintercalating lithium ions. The active material adapted to intercalate and deintercalate lithium ions may be any known material that is capable of intercalating and deintercalating lithium ions. For example, the active material capable of intercalating and deintercalating lithium ions may be tin (Sn) metal or a Sn-based alloy, but the active material is not limited thereto. The Sn-based alloy may include, for example, Sn and at least one of iron (Fe), copper (Co), nickel (Ni), zinc (Zn), manganese (Mn) or bismuth (Bi). However, any suitable Sn-based alloy may be used.

Figure 2C:
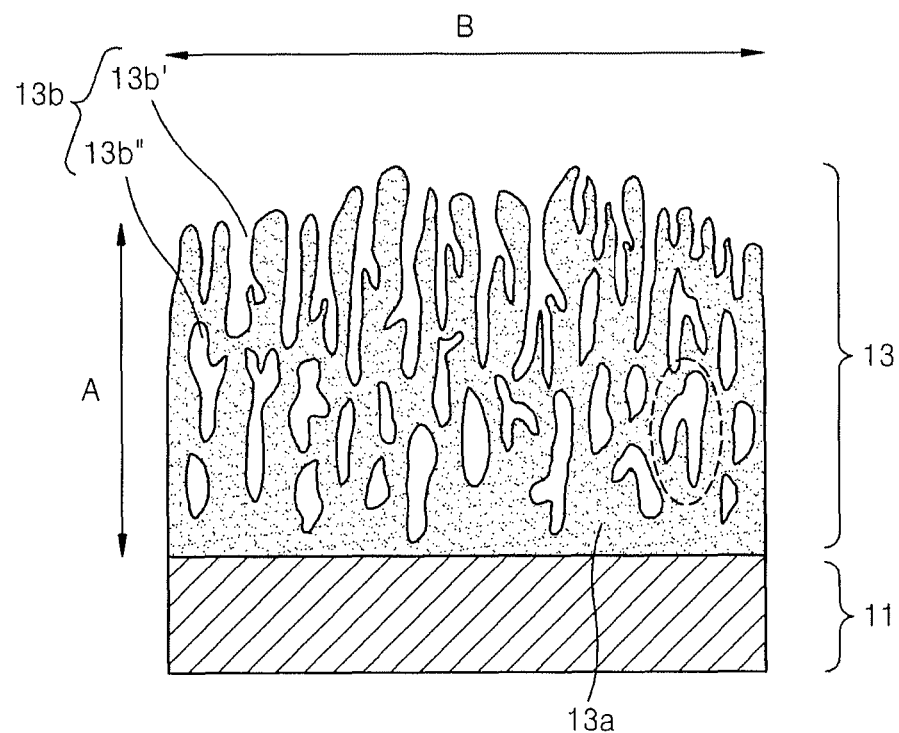
FIG. 2C is a schematic cross-sectional view taken along a line I-I' of FIG. 2B.

FIG. 2C is a schematic cross-sectional view taken along a line I-I' of FIG. 2B. Referring to FIG. 2C, the pores 13b included in the first crystal grain 13 may include open pores 13b' that are open with respect to the surface of the first crystal grain 13 and closed pores 13b" that are under the surface of the first crystal grain 13.

The matrix 13a may repeatedly swell and shrink as lithium ions are repeatedly intercalated or deintercalated. However, due to compression of the pores 13b during intercalation of lithium ions, an increase in volume of the active material layer 15 may be reduced or substantially prevented. In addition, even when the thickness of the active material layer 15 is increased due to intercalation, a stress relaxation effect may be obtained due to the pores 13b of the first crystal grain 13. Thus, the negative electrode 10 including the active material layer 15 of embodiments of the present invention may have improved capacity and cycle life.

Figure 2D:
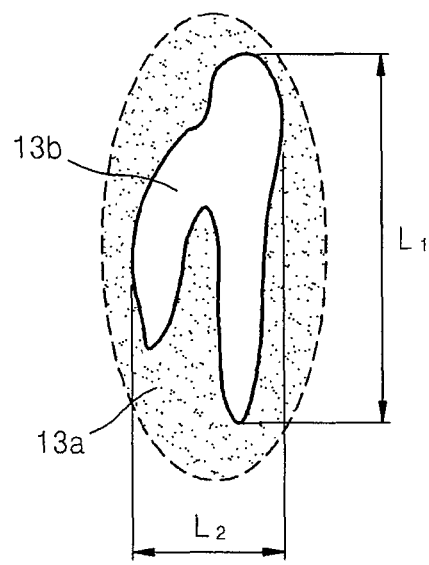
FIG. 2D is a schematic enlarged view of a first pore inside the dashed circle of FIG. 2C.

FIG. 2D is an enlarged view of a first pore $13b_1$ inside the dashed circle of FIG. 2C. The first pore $13b_1$ has a first length $L_1$ and a second length $L_2$. The first length $L_1$ is the maximum length among lengths orthogonal to the first surface of the current collector 11 (that is, lengths parallel to direction "A" of FIG. 2C, or perpendicular to the surface of the current collector that contacts the active material layer 15), and the second length $L_2$ is the maximum length among lengths orthogonal to the first length (that is, lengths parallel to direction "B" of FIG. 2C). In the first pore $13b_1$, the first length $L_1$ is greater than the second length $L_2$.

In the present specification, the term "first length" refers to the maximum length, among lengths of a pore, that is orthogonal to the first surface of the current collector 11 (for example, $L_1$ of FIG. 2D). In addition, in the present specification, the term "second length" refers to the maximum length, among lengths of a respective pore, that is orthogonal to the first length (for example, $L_2$ of FIG. 2D). The first length and second length of the closed pores 13b" may be easily understood with reference to FIG. 2D. A first length and second length of each of the open pores 13b' is a first length and second length of an imaginary closed pore formed by connecting upper inner walls of a cross-section of the open pore 13b'.

In the present specification, the term "first pore" refers to pores that have the first length greater than the second length when comparing first lengths and second lengths obtained using the method described above. The pores 13b may selectively further include, in addition to the first pore described above, other pores, for example, a pore that has identical first and second lengths, or a pore that has the first length smaller than the second length.

When lithium ions are intercalated into the active material layer 15, the active material of the active material layer 15 may expand radially. Thus, when the first length $L_1$ of the first pore $13b_1$ is greater than the second length $L_2$, a horizontal strain affecting a crystal grain may be efficiently reduced or eliminated. In addition, the inclusion of the empty space of the first pore $13b_1$ having the first length $L_1$ greater than the second length $L_2$ allows a space for volumetric expansion of the active material. Thus, separation and destruction of the active material layer 15, which can occur when the active material is deformed by intercalation of lithium, may be reduced or minimized. If the second length $L_2$ of the first pore $13b_1$ is greater than the first length $L_1$ (assuming that the thickness of active material layer is the same as in the embodiment of the present invention described above), the shear stress caused by volumetric expansion of the surface of the active material layer 15 results in separation of the active material layer 15 from the current collector 11 and deformation of the current collector 11 and thus, cycle life characteristics of the battery may be degraded.

In the first crystal grain 13, the first pore $13b_1$ (that is, those pores having a first length that is greater than a second length) accounts for 50% or more of the total volume of the pores. In other words, there are a plurality of first pores $13b_1$ in the first crystal grain 13. For example, in some embodiments, the first pore $13b_1$ accounts for 70% or more, or 90% or more of the total volume of the pores 13b. In some embodiments, in the first crystal grain 13, the first pore $13b_1$ may account for 100% of the total volume of the pores 13b.

In the first pore $13b_1$, a first length $L_1$ to second length $L_2$ ratio may be in the range of 2:1 to 2000:1. For example, in some embodiments, a first length $L_1$ to second length $L_2$ ratio may be in the range of 10:1 to 50:1. However, any suitable first length $L_1$ to second length $L_2$ ratio may be used.

In the first pore $13b_1$, the first length $L_1$ may be in the range of about 1 µm to about 10 µm. In some embodiments, for example, the first length $L_1$ may be in the range of about 2 µm to about 5 µm. However, any suitable first length $L_1$ may be used. In the first pore $13b_1$, the second length $L_2$ may be in the range of about 50 nm to about 500 nm. In some embodiments, for example, the second length $L_2$ may be in the range of about 100 nm to about 200 nm. However, any suitable second length $L_2$ may be used. In the first pore $13b_1$, the first length $L_1$ and the second length $L_2$ may be selected within the disclosed ranges, however, the first length $L_1$ should be greater than the second length $L_2$.

The first pore $13b_1$ may be included in the first crystal grain 13 as described above. However, the first pore $13b_1$ may also be present at the interface between adjacent crystal grains.

The porosity of the active material layer 15 may be in the range of 5% to 30%. For example, in some embodiments, the porosity of the active material layer 15 may be in the range of 10% to 15%. The porosity of the active material layer 15 may be a percentage of the total volume of all the pores present in the active material layer 15 based on the total volume of the active material layer 15. Although not limited to the following theory, the disclosed porosity may be obtained as a result of the presence of the first pore $13b_1$. When the porosity of the active material layer 15 is within this range, it is believed that the volumetric expansion of the active material layer 15, which accompanies charging and discharging of a lithium battery, may be substantially reduced.

A particle diameter of each of the crystal grains included in the active material layer 15 may be in the range of about 1.5 µm to about 10 µm. For example, in some embodiments, the particle diameter of each crystal grain ranges from about 1.5 µm to about 6 µm. As used herein, the "particle diameter" of each of the crystal grains refers to a particle diameter of an imaginary sphere that contacts all the edges of the surface of the corresponding crystal grain.

The thickness of the active material layer 15 may be in the range of about 1 µm to about 20 µm. For example, in some embodiments, the thickness of the active material layer 15 is between about 3 µm and about 6 µm. However, any suitable thickness may be used for the active material layer 15. When the thickness of the active material layer 15 is within this range, and the active material layer 15 includes the first pore $13b_1$, a stress relaxation effect may be obtained and thus, capacity and cycle life of a battery including the disclosed negative electrode 10 may be improved.

In some embodiments, the active material layer 15 may be manufactured by using a plating method. A plating method of manufacturing the active material layer 15 may include: preparing a current collector and a plating solution including a precursor of an active material capable of intercalating and deintercalating lithium ions and immersing the current collector in the plating solution to form the active material layer 15 on the current collector.

Suitable current collectors have been described above. Non-limiting examples of materials suitable for use as a current collector 11 include copper foil, nickel foil, stainless steel foil, titanium foil, nickel foam, copper foam, or a polymer substrate coated with conductive metal.

The plating solution includes a precursor of the active material capable of intercalating and deintercalating lithium ions. For example, if the active material is Sn metal, the precursor of the active material may be a sulfate, carbonate, or nitrate of Sn. In other embodiments, if the active material is Sn metal, any suitable precursor may be used. The precursor may also be a mixture of at least two types of materials. For example, if the active material is a Sn-based alloy, the precursor of the active material may further include, in addition to the sulfate, carbonate, or nitrate of Sn, a sulfate, carbonate, or nitrate of a metal that is alloyed with the Sn. In other embodiments, if the active material is a Sn-based alloy, any suitable precursor may be used. For example, if the active material is an alloy of Sn and Cu, the plating solution may include $SnSO_4$ and $CuSO_4$. The plating solution may also include other materials. For example, the plating solution may further include sulfuric acid or other free acids. However, other materials useful in a plating solution may also be used.

The type and concentration of the precursor, or, if at least two types of precursors were used, a mixture ratio of the precursors, may be selected in consideration of the thickness or structure of the active material layer to be formed. For example, if the active material is an alloy of Sn and Cu, the concentration of a Sn-containing precursor and the concentration of a Cu-containing precursor may be selected in such a manner that the weight ratio of Sn to Cu may be in the range of 99.5:0.5 to 98:2. For example, in some embodiments, the concentration of a Sn-containing precursor and the concentration of a Cu-containing precursor may result in a weight ratio of Sn to Cu in the range of 99:1 to 98:2. However, the precursors may be provided so that the weight ratio of Sn to Cu is any suitable weight ratio. For example, $0.2M$ $SnSO_4$ and $0.003M$ $CuSO_4$ may be used to form a Sn and Cu alloy active material. However, any suitable method may be used to form an alloy of Sn and Cu.

The current collector may be immersed in the plating solution prepared as described above, thereby forming the active material layer on the current collector. When immersing the current collector in the plating solution, the current collector may be disposed to be parallel to the ground surface. During the plating, a side of the current collector is connected to a plating electrode and another side of the current collector is connected to a to-be-plated electrode. A current applied through the plating electrode and the to-be-plated electrode may vary according to the concentration of the precursor in the plating solution, and it may be a current density of about 1 $A/dm^2$ to about 10 $A/dm^2$. For example, in some embodiments, the applied current density may be about 2 $A/dm^2$ to about 6 $A/dm^2$. During plating, the temperature of the plating solution may vary according to the concentration of the precursor in the plating solution, and may be, for example, about 20° C. to about 40° C. The plating time may also vary according to the concentration of the precursor in the plating solution, and may be in the range of about 0.5 minutes to about 7 minutes. For example, in some embodiments, the plating time may be about 4 minutes to about 7 minutes. The distance between the plating electrode and the to-be-plated electrode may vary according to the concentration of the precursor in the plating solution, and may be, for example, in the range of about 1 cm to about 10 cm. For example, in some embodiments the distance between the plating electrode and the to-be-plated electrode may be about 2 cm to about 5 cm.

The first pore $13b_1$ described above may be obtained by controlling the plating current, the plating temperature, the plating time, and the distance between the plating electrode and the to-be-plated electrode. Alternatively, the first pore $13b_1$ may be formed by gas, such as hydrogen gas, generated when the matrix $13a$ is formed during plating. That is, if hydrogen gas is not removed from the matrix $13a$, the hydrogen gas may rise upward due to its weight, and thus may act as a template to form the first pore $13b_1$. Thus, the first pore $13b_1$ may be easily formed without a complicated process, such as a process of adding a chemical material, such as a surfactant, and heat treating the chemical material to remove it.

The negative electrode described above may be used to manufacture a lithium battery. For example, a lithium battery including the negative electrode, a positive electrode, and an electrolyte may be provided.

The positive electrode may include a current collector and a positive electrode active material layer formed on the current collector. A positive electrode active material for forming a positive electrode active material layer may be a compound (lithiated intercalation compounds) capable of intercalating and deintercalating lithium ions. The positive electrode active material may include at least one type of complex oxide such as a complex oxide of lithium and a metal such as cobalt, manganese, nickel, or combinations thereof. The positive electrode active material may be represented by any one of the following formulae:

$Li_aA_{1-b}X_bD_2$ where $0.95 \leq a \leq 1.1$ and $0 \leq b \leq 0.5$; $Li_aE_{1-b}X_bO_{2-c}D_c$ where $0.95 \leq a \leq 1.1$, $0 \leq b \leq 0.5$, and $0 \leq c \leq 0.05$; $LiE_{2-b}X_bO_{4-c}D_c$ where $0 \leq b \leq 0.5$, and $0 \leq c \leq 0.05$; $Li_aNi_{1-b-c}Co_bBcD_a$ where $0.95 \leq a \leq 1.1$, $0 \leq b \leq 0.5$, $0 \leq c \leq 0.05$, and $0 < a \leq 2$; $Li_aNi_{1-b-c}Co_bX_cO_{2-a}M_a$ where $0.95 \leq a \leq 1.1$, $0 \leq b \leq 0.5$, $0 \leq c \leq 0.05$, and $0 < a < 2$; $Li_aNi_{1-b-c}Co_bX_cO_{2-a}M_2$ where $0.95 \leq a \leq 1.1$, $0 \leq b \leq 0.5$, $0 \leq c \leq 0.05$, and $0<a<2$; $Li_aNi_{1-b-c}Mn_bX_cD_a$ where $0.95 \leq a \leq 1.1$, $0 \leq b \leq 0.5$, $0 \leq c \leq 0.05$, and $0<a<2$; $Li_aNi_{1-b-c}Mn_bX_cO_{2-a}M_a$ where $0.95 \leq a \leq 1.1$, $0 \leq b \leq 0.5$, $0 \leq c \leq 0.05$, and $0<a<2$; $Li_aNi_{1-b-c}Mn_bX_cO_{2-a}M_2$ where $0.95 \leq a \leq 1.1$, $0 \leq b \leq 0.5$, $0 \leq c \leq 0.05$, and $0<a<2$; $Li_aNi_bE_cG_dO_2$ where $0.90 \leq a \leq 1.1$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1.1$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.1$, and $0.001 \leq b \leq 0.1$; $Li_aCoG_bO_2$ where $0.90 \leq a \leq 1.1$, and $0.001 \leq b \leq 0.1$; $Li_aMnG_bO_2$ where $0.90 \leq a \leq 1.1$, and $0.001 \leq b \leq 0.1$; $Li_aMn_2G_bO_4$ where $0.90 \leq a \leq 1.1$, and $0.001 \leq b \leq 0.1$; $QO_2$; $QS_2$; $LiQS_2$; $V_2O_5$; $LiV_2O_5$; $LiZO_2$; $LiNiVO_4$; $Li_{3-f}J_2(PO_4)_3$ $0 \leq f \leq 2$; $Li_{3-f}Fe_2(PO_4)_3$ $0 \leq f \leq 2$; and $LiFePO_4$.

In the above formulae, A is selected from Ni, Co, Mn, and combinations thereof; X is selected from Al, Ni, Co, Mn, Cr, Fe, Mg, Sr, V, a rare-earth element, and combinations thereof; D is selected from O, F, S, P, and combinations thereof; E is selected from Co, Mn, and combinations thereof; M is selected from F, S, P, and combinations thereof; G is selected from Al, Cr, Mn, Fe, Mg, La, Ce, Sr, V, and combinations thereof; Q is selected from Ti, Mo, Mn, and combinations thereof; Z is selected from Cr, V, Fe, Sc, Y, and combinations thereof; and J is selected from V, Cr, Mn, Co, Ni, Cu, and combinations thereof. However, A, X, D, E, M, G, Q, Z, and J are not limited thereto.

The positive electrode active material may be used together with a coating layer. Alternatively, the positive electrode active material may be mixed with another positive electrode active material having a coating layer. The coating layer may include at least one coating element compound selected from an oxide of a coating element, a hydroxide of a coating element, an oxyhydroxide of a coating element, an oxycarbonate of a coating element, and a hydroxycarbonate of a coating element. The material for forming the coating layer may be amorphous or crystalline. The coating element contained in the coating layer may be Mg, Al, Co, K, Na, Ca, Si, Ti, V, Sn, Ge, Ga, B, As, Zr, or mixtures thereof.

The coating layer may be formed using the coating element according to any method that does not affect the properties of the positive electrode active material. For example, the coating layer may be formed by using a spray coating method or an immersion coating method, both of which are well known to those of ordinary skill in the art and thus will not be described in detail herein.

The positive electrode active material layer may include a binder and a conducting material. The binder may help positive electrode active material particles adhere to each other, and also, help the positive electrode active material adhere to the current collector. Examples of suitable binders include, but are not limited to, polyvinyl alcohol, carboxymethylcellulose, hydroxypropylcellulose, diacetylcellulose, polyvinyl chloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conducting material provides conductivity to the positive electrode, and may be any conducting material that does not cause any chemical change (i.e., it does not react) in a lithium battery. Examples of the conducting material include a carbonaceous material such as natural graphite, artificial graphite, carbon black, acetylene black, ketjen black, or carbon fiber; metal such as copper, nickel, aluminum, or silver, each of which may be used in powder or fiber form; a conductive polymer such as a polyphenylene derivative; and mixtures thereof.

The current collector for the positive electrode may include Al, but is not limited thereto. Any suitable material may be used for the current collector of the positive electrode.

The positive electrode may be manufactured by preparing an active material composition by mixing the positive electrode active material, the conducting material, and the binder in a solvent and then coating the active material composition on the current collector. Such a method of manufacturing the positive electrode is well known in the art and thus will not be described in detail herein. The solvent may be N-methylpyrrolidone, however, any suitable solvent may be used.

The electrolyte may include a non-aqueous organic solvent and a lithium salt. The non-aqueous organic solvent provides a medium through which ions of the lithium battery, engaging in an electrochemical reaction, move.

The non-aqueous organic solvent may be a carbonate-based solvent, an ester-based solvent, an ether-based solvent, a ketone-based solvent, an alcohol-based solvent, or a non-protonic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and ethylmethyl carbonate (EMC). Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone. Examples of the ether-based solvent include dibutylether, tetraglyme, diglyme, dimethoxyethane, 2-methyltetrahydrofurane, and tetrahydrofurane. Examples of the ketone-based solvent include cyclohexanone. Examples of the alcohol-based solvent include ethyl alcohol, and isopropyl alcohol. Examples of the non-protonic solvent include a nitrile such as R—CN where R is a linear, branched, or cyclic C2 to C20 hydrocarbon group and may include a double bond, an aromatic ring, or an ether; an amide such as dimethylformamide; and a dioxolane or sulfolane such as 1,3-dioxolane.

These non-aqueous organic solvents may be used alone or in combination. If used in combination, a mixture ratio may be appropriately controlled according to a target battery performance, which may be known by those of ordinary skill in the art.

The lithium salt may be dissolved in an organic solvent and acts as a supplier of lithium ions in the lithium battery and thus enables the basic operation of the lithium battery. In addition, the lithium salt promotes flow of lithium ions between the positive electrode and the negative electrode. The lithium salt includes, as a supporting electrolytic salt, one or two salts selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, and $LiB(C_2O_4)_2$ (lithium bis(oxalato) borate; LiBOB). The concentration of the lithium salt may be in the range of about 0.1 to about 2.0 M. If the concentration of the lithium salt is within this range, the electrolyte has appropriate conductivity and viscosity and thus has excellent electrolyte performance and lithium ions may effectively move.

According to the type of lithium battery, a separator may be disposed between the positive electrode and the negative electrode. The separator may be a single or multi-layer separator including polyethylene, polypropylene, or polyvinylidene fluoride. The separator may also be a mixed multi-layer separator, such as a double-layer separator containing polyethylene and polypropylene, a three-layer separator containing polyethylene, polypropylene, and polyethylene, or a three-layer separator containing polypropylene, polyethylene, and polypropylene.

Lithium batteries may be categorized into a lithium ion battery, a lithium ion polymer battery, and a lithium polymer battery, according to the separator and electrolyte used. Lithium batteries may also be categorized into a cylindrical lithium battery, a rectangular-shaped lithium battery, a coin-shaped lithium battery, and a pouch-shaped lithium battery, according to the shape of the lithium battery. Lithium batteries may also be categorized into a bulk-type lithium battery and a thin layer-type lithium battery, according to the size of the lithium battery. These lithium batteries may be primary batteries or secondary batteries. A method of manufacturing the lithium batteries is known in the art and thus will not be described in detail herein.

Figure 3:
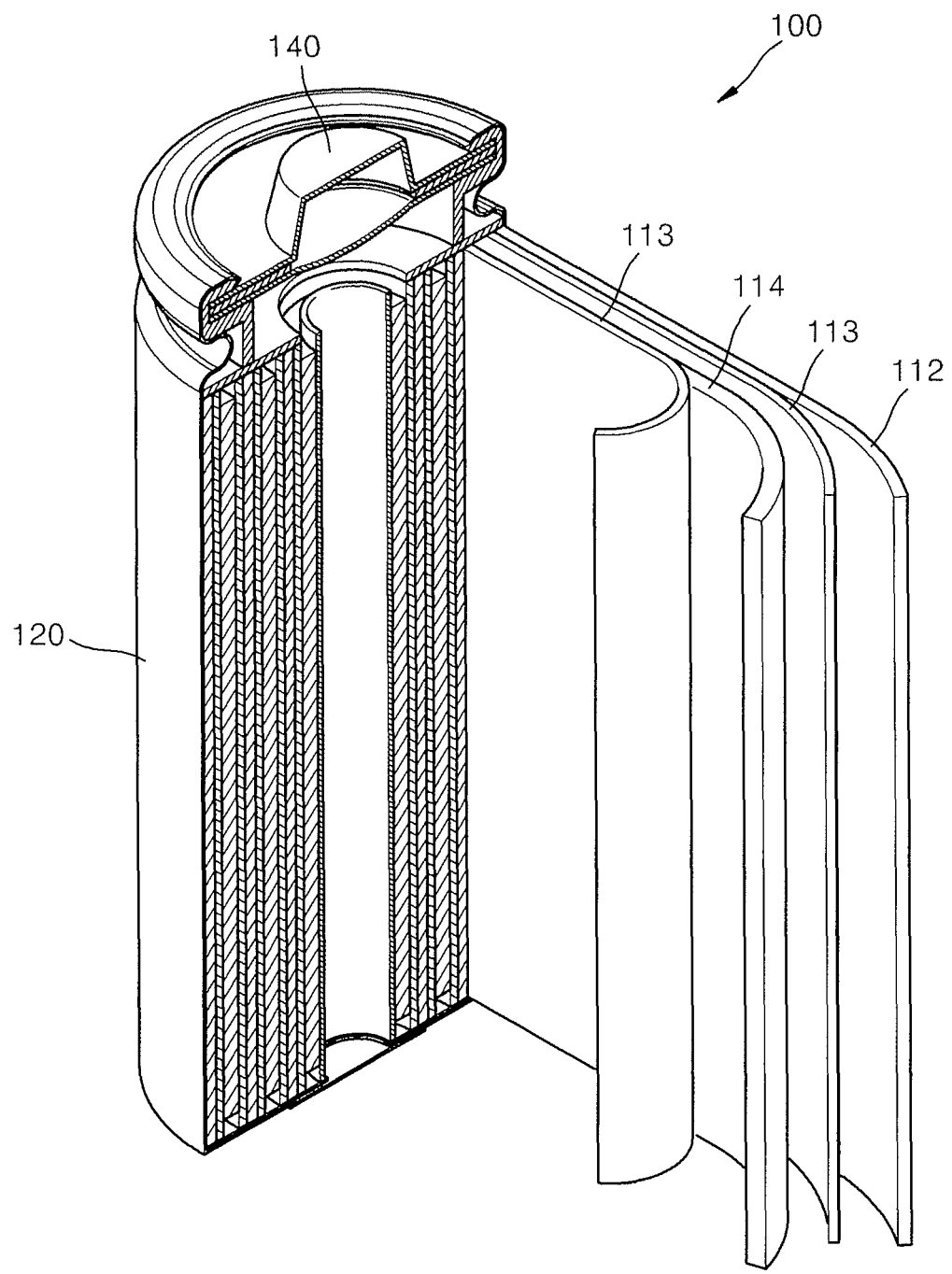
FIG. 3 is a schematic exploded perspective view of a lithium battery according to an embodiment of the present invention.

FIG. 3 is an exploded perspective view of a lithium battery 100 according to an embodiment of the present invention. Referring to FIG. 3, the lithium battery 100 includes a positive electrode 114, a negative electrode 112, a separator 113 interposed between the positive electrode 114 and the negative electrode 112, an electrolyte (not shown) impregnated into the positive electrode 114, the negative electrode 112, and the separator 113, a battery container 120, and an encapsulation member 140 for sealing the battery container 120. The lithium secondary battery 100 illustrated in FIG. 3 is assembled by sequentially stacking the positive electrode 114, the negative electrode 112, and the separator and then winding the stack in a spiral form in the battery container 120.

The following Examples and Comparative Examples illustrate this disclosure in more detail. The following are mere examples of this disclosure and are not intended to limit the spirit and scope of this disclosure.

EXAMPLE 1

Figure 4A:
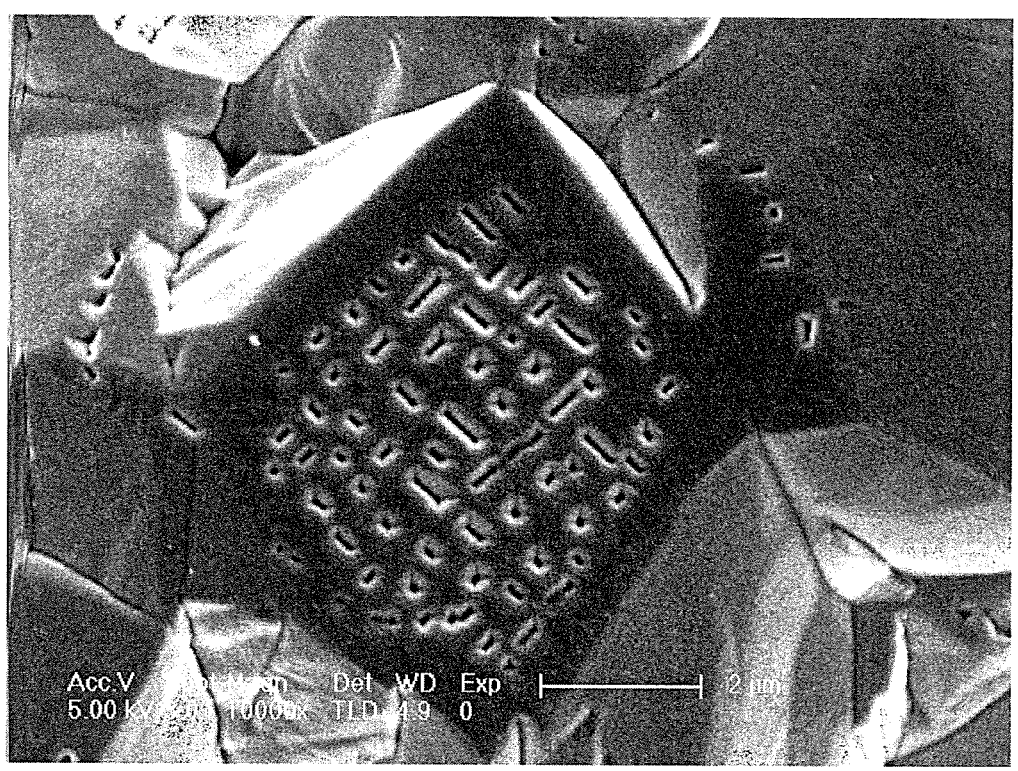
FIG. 4A is a scanning electron microscopic (SEM) image of the surface of an active material layer of a negative electrode manufactured according to Example 1.

A Cu collector was prepared by obtaining a 0.25 dm$^2$-sized Cu foil, removing a surface oxide layer of the Cu foil with 5 volume % of $H_2SO_4$ aqueous solution, and then washing the resultant foil with an alkali aqueous solution and deionized water. Then, a 0.2M $SnSO_4$ and 0.003M $CuSO_4$-containing bath was prepared. A Sn electrode was used as a plating electrode and a Cu foil was used as a to-be-plated electrode. The temperature of the plating solution was kept at about 40° C. Then, electro-plating was performed by applying a current density of 5 A/dm$_2$ for 4 minutes while stirring the plating solution at a rate of 50 rpm. As a result, a Sn:Cu alloy active material layer having a thickness of 20 μm was formed on the Cu collector, thereby forming a negative electrode. FIG. 4A is a scanning electron microscopic (SEM) image of the surface of the Sn:Cu alloy active material layer.

EXAMPLE 2

A negative electrode was manufactured in substantially the same manner as in Example 1, except that the plating solution was not stirred during the electro-plating and thus, hydrogen, which was generated during the electro-plating, was not removed.

Figure 4B:
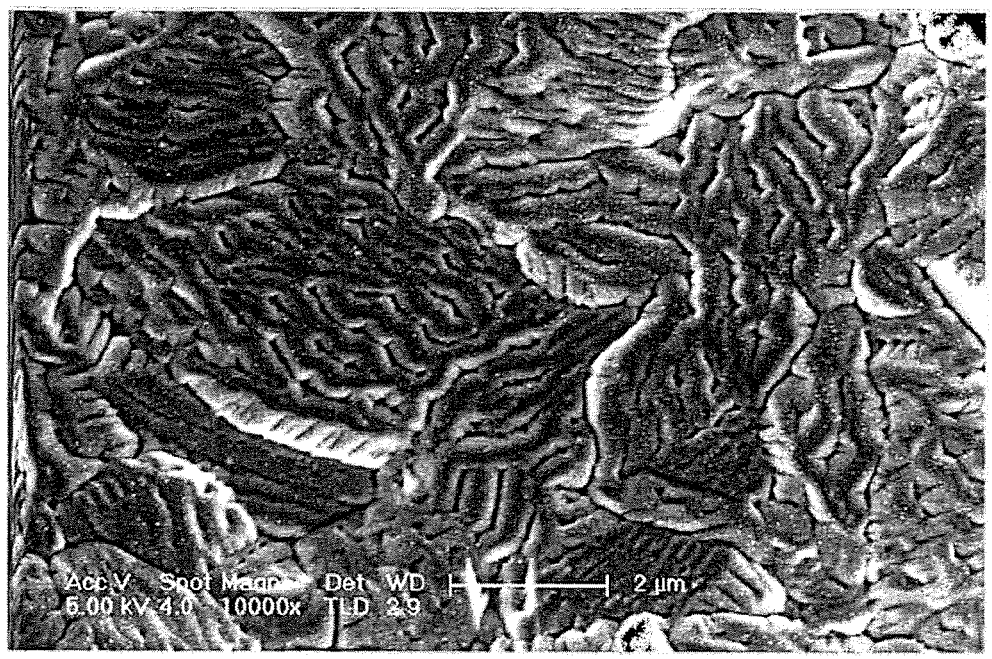
FIGS. 4B and 4C are SEM images of the surface of an active material layer of a negative electrode manufactured according to Example 2 at two different resolutions.
Figure 4C:
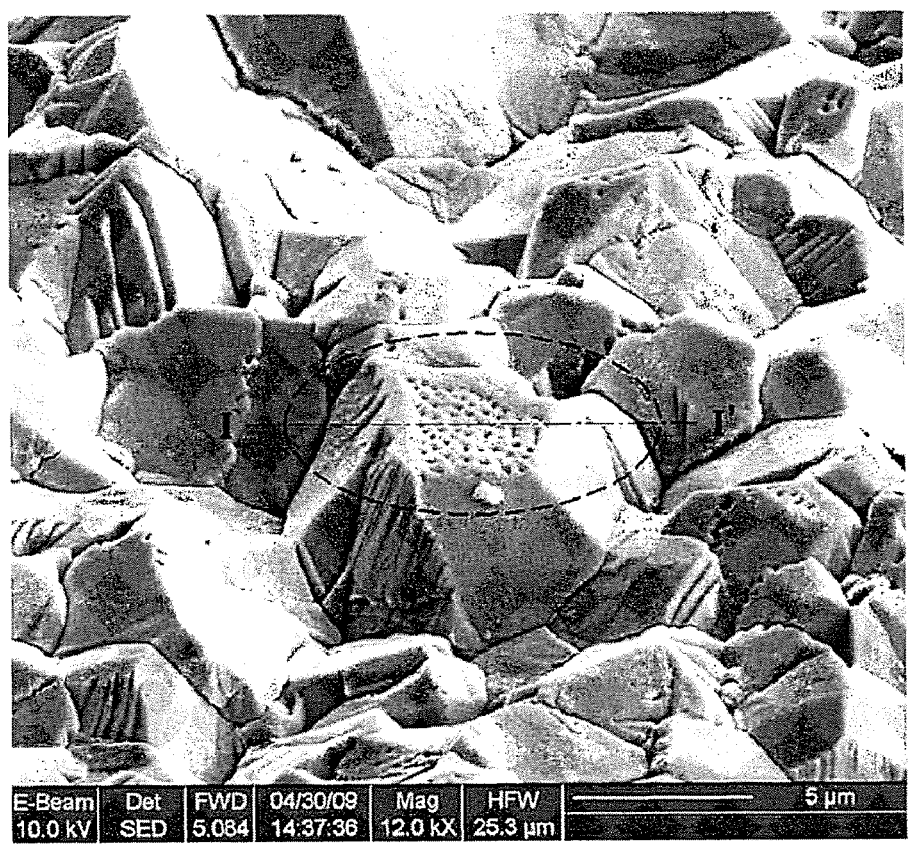

FIGS. 4B and 4C are SEM images of the surface of the Sn:Cu alloy active material layer of Example 2 at different resolutions. FIG. 4C is an enlarged view of a portion of the surface of the Sn:Cu alloy active material layer of FIG. 4B. Referring to FIG. 4C, the surface of the Sn:Cu alloy active material layer includes a plurality of crystal grains, and a crystal grain indicated inside the dashed circle (first crystal grain) includes a plurality of pores.

Figure 4D:
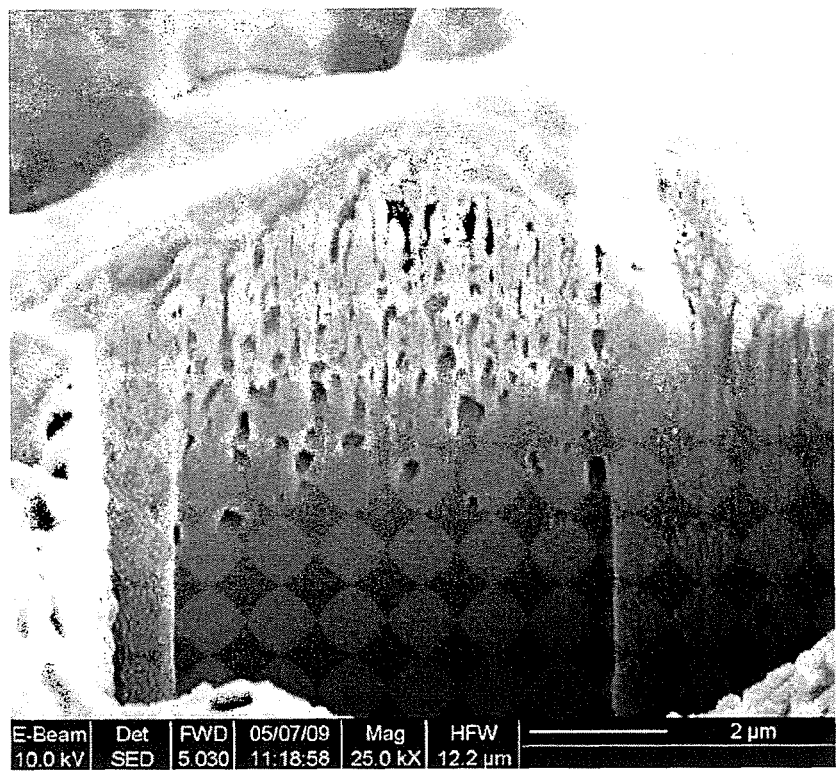
FIG. 4D is a focused ion beam (FIB) image of a negative electrode manufactured according to Example 2.

FIG. 4D is a cross-sectional view taken along a line I-I' inside the dashed circle of FIG. 4C. The cross-section illustrated in FIG. 4D is orthogonal to the surface of the collector. Referring to FIG. 4D, the first crystal grain includes a plurality of pores including open pores and closed pores, and the pores include at least one first pore which has a first length and a second length, wherein the first length is the maximum length among lengths orthogonal to the surface of the Sn:Cu alloy active material layer (and the current collector) and the second length is the maximum length among lengths orthogonal to the first length, and the first length is greater than the second length.

COMPARATIVE EXAMPLE 1

A Cu current collector was prepared in substantially the same manner as in Example 1. Natural graphite and polyvinylidene fluoride binder were mixed in a weight ratio of 96:4 in an N-methylpyrrolidone solvent, thereby preparing a negative electrode slurry. The negative electrode slurry was coated on Cu-foil to form a thin electrode plate having a thickness of 14 μm, dried at a temperature of 135° C. for at least 3 hours, and then subjected to pressing, thereby manufacturing a negative electrode having a density of 1.8 g/cc.

COMPARATIVE EXAMPLE 2

Figure 5:
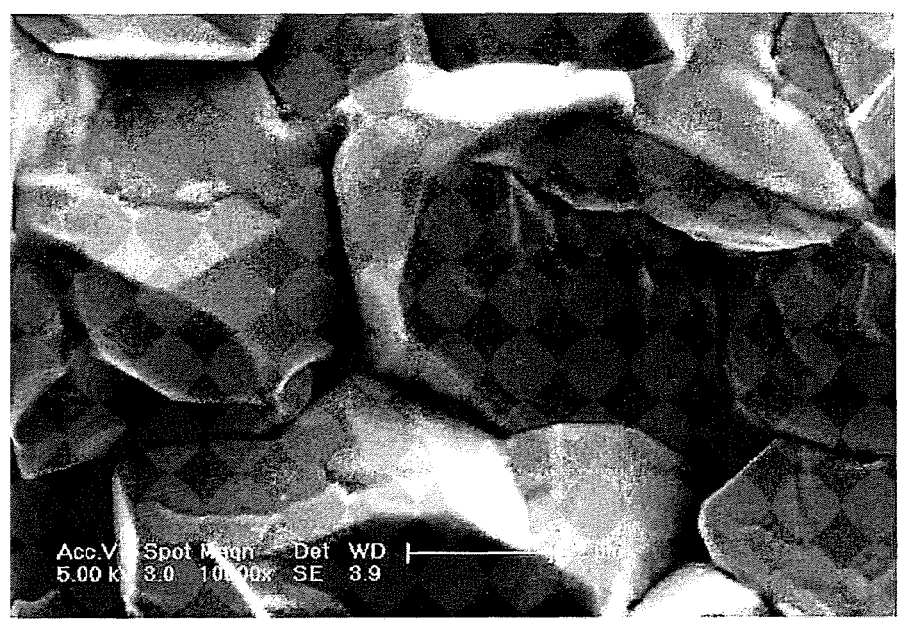
FIG. 5 is an SEM image of a negative electrode manufactured according to Comparative Example 2.

A Cu current collector was prepared in substantially the same manner as in Example 1. Then, a 0.2M $SnSO_4$ and 0.003M $CuSO_4$-containing electrolytic bath was prepared. A Sn electrode was used as a plating electrode and a Cu foil was used as a to-be-plated electrode. The temperature of a plating solution containing the 0.2M $SnSO_4$ and 0.003M $CuSO_4$ was controlled to be about 50° C. Then, electro-plating was performed with a current density of 12 A/dm$_2$ for 0.45 minutes while stirring the plating solution at a rate of 50 rpm. As a result, a Sn:Cu alloy active material layer having a thickness of 20 μm was formed on the Cu collector, thereby forming a negative electrode. As a result of the method used in Comparative Example 2 (i.e., temperature, current density, plating time, etc.) the resulting Sn:Cu alloy active material layer does not include pores. FIG. 5 is an SEM images of the surface of the Sn:Cu alloy active material layer of Comparative Example 2. As can be seen in FIG. 5, no pores are present in the surface of the active material layer.

Evaluation

1) Manufacturing of Batteries

Batteries were manufactured to perform an electrochemical characteristics test using the negative electrodes manufactured according to Comparative Examples 1 and 2 and Examples 1 and 2.

The negative electrodes manufactured according to Examples 1 and 2 and Comparative Examples 1 and 2 were used as a negative electrode in respective batteries, and a lithium electrode was used as a positive electrode in each of the batteries. In each battery, the positive and negative electrodes were wound together with a separator including polyethylene having a thickness of 20 μm and then pressed.

Then, an electrolyte was injected into each battery to form a coin-cell battery. The electrolyte was prepared by dissolving $LiPF_6$ into a mixed solvent including ethylene carbonate (EC), ethylmethyl carbonate (EMC) and diethyl carbonate (DEC) in a volume ratio of 3:5:2 in such a manner that the concentration of $LiPF_6$ was 1.15 M.

2) Density and Initial Capacity Evaluation

Figure 6:
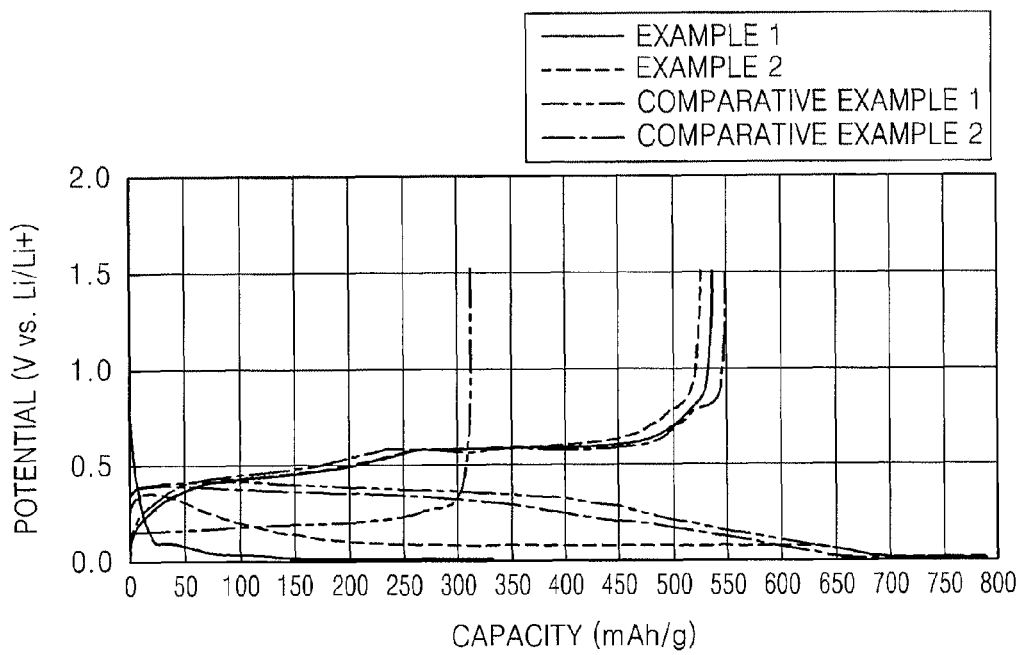
FIG. 6 is a graph of initial capacity of batteries including negative electrodes manufactured according to Comparative Examples 1 and 2 and Examples 1 and 2.

The density and initial capacity of the batteries including the negative electrodes of Comparative Examples 1 and 2 and Examples 1 and 2 were evaluated. The results are shown in Table 1 and FIG. 6. The initial capacity was measured by performing one cycle at 0.01 V constant current (CC)/constant voltage (CV) and 0.01 C cut-off charging at a charging rate of 0.2 C. Then 1.1 V cut-off discharging was performed at a discharging rate of 0.2 C.

TABLE 1

|  | Battery including the negative electrode of Comparative Example 1 | Battery including the negative electrode of Comparative Example 2 | Battery including the negative electrode of Example 1 | Battery including the negative electrode of Example 2 |
| --- | --- | --- | --- | --- |
| Density (g/cc) | 1.8 | 6.1 | 6.9 | 6.8 |
| Initial capacity (mAh/g) | 332 | 549 | 534 | 558 |

3) Cycle Life Evaluation

Figure 7:
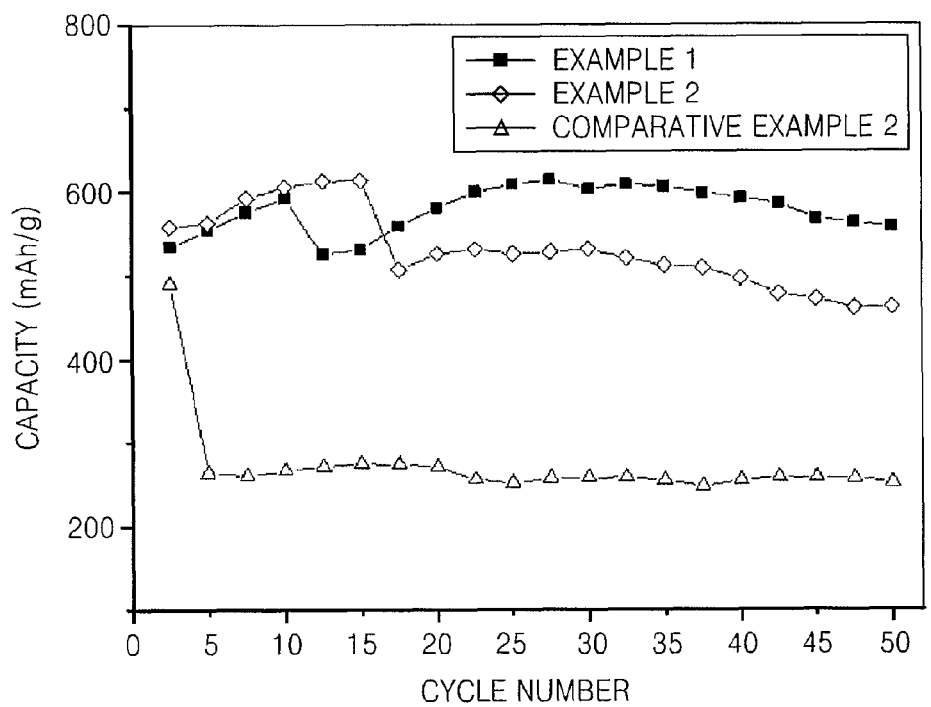
FIG. 7 is a graph of the cycle life of batteries including negative electrodes manufactured according to Comparative Example 2 and Examples 1 and 2.

Capacities were measured by performing the above described cycle 50 times on the batteries including the negative electrodes manufactured according to Comparative Example 2 and Examples 1 and 2. The results are shown in FIG. 7. In addition, capacity retention rate of the respective batteries was calculated according to the following formula:

$$\frac{\text{Capacity after 50 cycles}}{\text{Initial capacity}} \times 100\, (\%).$$

TABLE 2

|  | Battery including the negative electrode of Comparative Example 2 | Battery including the negative electrode of Example 1 | Battery including the negative electrode of Example 2 |
| --- | --- | --- | --- |
| Density (g/cc) | 6.1 | 6.9 | 6.8 |
| Capacity after 50 cycles (mAh/g) | 251 | 558 | 462 |
| Capacity retention rate (%) | 51 | 104 | 83 |

As can be seen in Table 2 and FIG. 7, batteries including the negative electrodes of Examples 1 and 2 have better cycle life characteristics than the battery including the negative electrode of Comparative Example 2. As can be seen, they have a higher capacity throughout the 50 cycle test and additionally, have a higher capacity retention rate.

As described above, a lithium battery including a negative electrode for a lithium battery according to an embodiment of the present invention has improved capacity and cycle life characteristics.

While the present invention has been described in connection with certain exemplary embodiments, it is understood by those of ordinary skill in the art that certain modifications may be made to the described embodiments without departing from the spirit and scope of the present invention, as defined by the appended claims and their equivalents.

What is claimed is:

1. A negative electrode for a lithium battery, the negative electrode comprising:

a current collector and an active material layer having a first surface in contact with a first surface of the current collector, the active material layer comprising a plurality of crystal grains comprising a first crystal grain comprising a matrix and a plurality of pores, the matrix comprising an active material adapted to intercalate and deintercalate lithium ions, and the plurality of pores comprising a first pore which has a first length and a second length, the first length being the maximum length among lengths orthogonal to the first surface of the current collector and the second length being the maximum length among lengths orthogonal to the first length, the first length being greater than the second length.

2. The negative electrode of claim 1, wherein a ratio of the first length to the second length is between 2:1 and 2000:1.

3. The negative electrode of claim 1, wherein the first length is between about 1 μm and about 10 μm.

4. The negative electrode of claim 1, wherein the second length is between about 50 nm and about 500 nm.

5. The negative electrode of claim 1, wherein a porosity of the active material layer is between about 10% and about 30%.

6. The negative electrode of claim 1, wherein a particle diameter of the first crystal grain is between about 1.5 μm and about 10 μm.

7. The negative electrode of claim 1, wherein the active material adapted to intercalate and deintercalate lithium ions comprises a Sn metal or a Sn-based alloy.

8. The negative electrode of claim 7, wherein the Sn-based alloy comprises an alloy comprising Sn and at least one metal selected from the group consisting of Fe, Co, Ni, Zn, Mn, and Bi.

9. The negative electrode of claim 1, wherein the pores of the first crystal grain have a total pore volume, there are a plurality of first pores having a total first pore volume, and the total first pore volume is 50% or more of the total pore volume.

10. A lithium battery comprising: a negative electrode; a positive electrode, and an electrolyte, the negative electrode comprising a current collector and an active material layer, the active material layer having a first surface in contact with a first surface of the current collector, the active material layer comprises a plurality of crystal grains comprising a first crystal grain comprising a matrix and a plurality of pores, the matrix comprising an active material adapted to intercalate and deintercalate lithium ions, and the plurality of pores comprising a first pore which has a first length and a second length, the first length being the maximum length among lengths orthogonal to the first surface of the current collector and the second length being the maximum length among lengths orthogonal to the first length, and the first length is greater than the second length.

11. The lithium battery of claim 10, wherein a ratio of the first length to the second length is between 2:1 and 2000:1.

12. The lithium battery of claim 10, wherein the first length is between about 1 μm and about 10 μm.

13. The lithium battery of claim 10, wherein the second length is between about 50 nm and 500 nm.

14. The lithium battery of claim 10, wherein a porosity of the active material layer is between about 10% and about 30%.

15. The lithium battery of claim 10, wherein a particle diameter of the first crystal grain is between about 1.5 μm and about 10 μm.

16. The lithium battery of claim 10, wherein the active material adapted to intercalate and deintercalate lithium ions comprises a Sn metal or a Sn-based alloy.

17. The lithium battery of claim 16, wherein the Sn-based alloy comprises an alloy comprising Sn and at least one metal selected from the group consisting of Fe, Co, Ni, Zn, Mn, and Bi.

18. A negative electrode for a lithium battery, the negative electrode comprising:

a current collector and an active material layer, the active material layer having a first surface in contact with the current collector, the active material layer comprising at least one crystal grain, the at least one crystal grain comprising a matrix and at least one pore, the matrix comprising an active material capable of intercalating and deintercalating lithium ions, and the at least one pore having a first length and a second length, the first length being the maximum length among lengths orthogonal to the first surface of the active material layer and the second length being the maximum length among lengths orthogonal to the first length, and the first length is greater than the second length.

* * * * *